Figure 1:
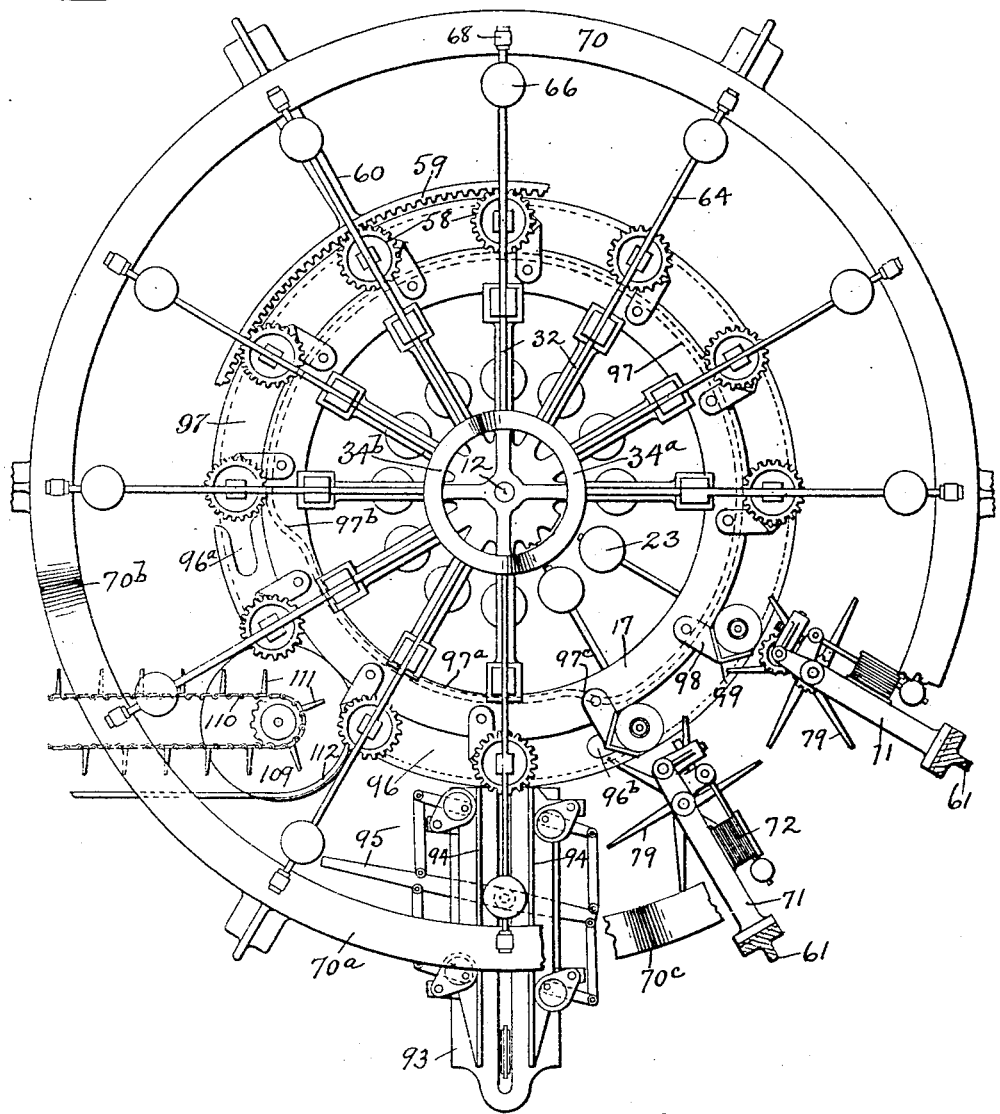

No. 874,956. PATENTED DEC. 31, 1907.
G. G. GLASS.
CAN CAPPING MACHINE.
APPLICATION FILED JULY 22, 1905.

5 SHEETS—SHEET 1.

WITNESSES:
S. N. Pond
M. B. Bliss

INVENTOR
George G. Glass
By Offield, Towle & Linthicum
ATTORNEYS

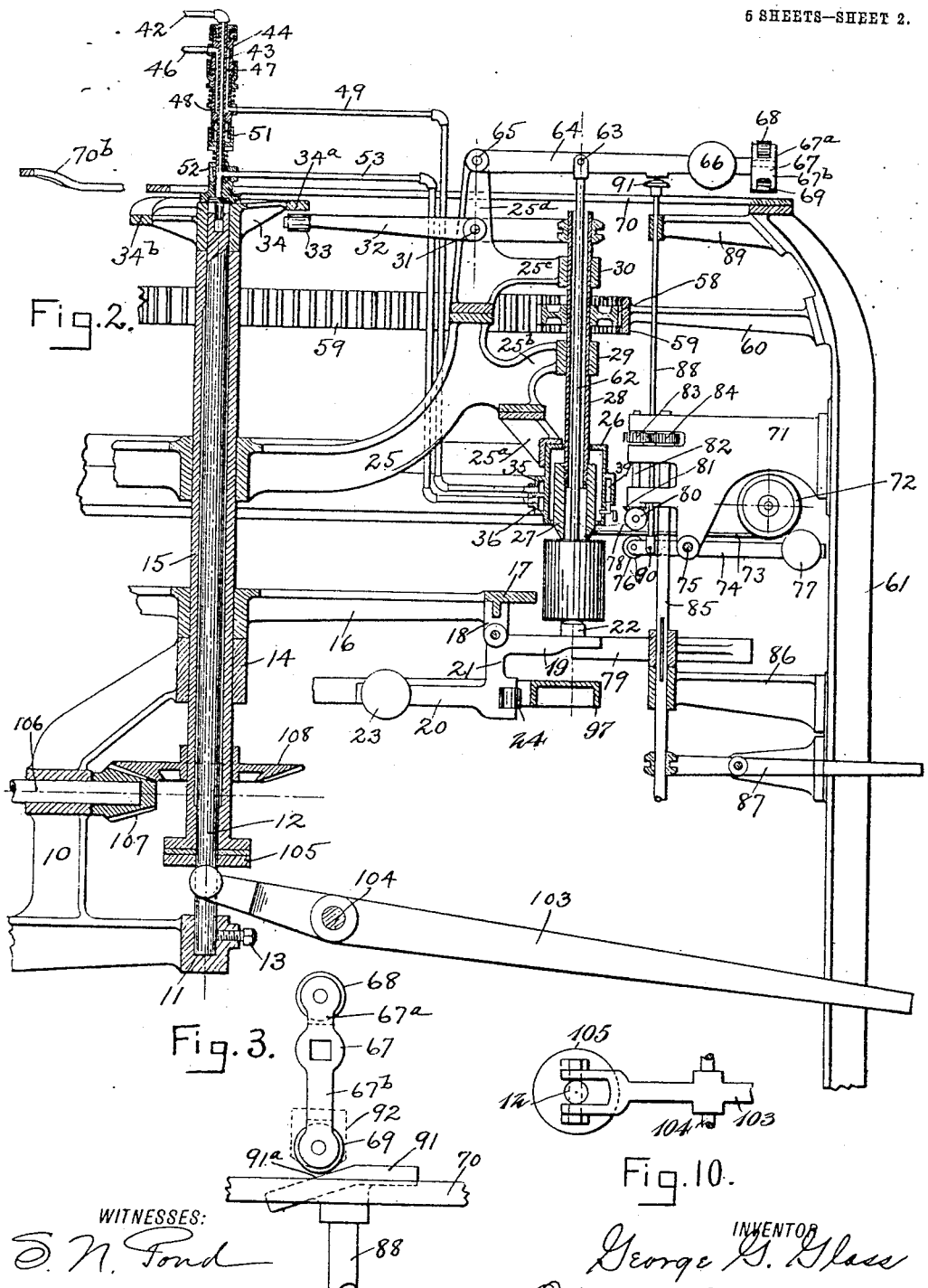

No. 874,956. PATENTED DEC. 31, 1907.
G. G. GLASS.
CAN CAPPING MACHINE.
APPLICATION FILED JULY 22, 1905.

5 SHEETS—SHEET 3.

WITNESSES:
S. N. Pond
M. B. Bliss

INVENTOR
George G. Glass,
By Offield, Towle & Linthicum
ATTORNEYS

No. 874,956. PATENTED DEC. 31, 1907.
G. G. GLASS.
CAN CAPPING MACHINE.
APPLICATION FILED JULY 22, 1905.

5 SHEETS—SHEET 4.

WITNESSES:
S. N. Pond
M. B. Bliss.

INVENTOR
George G. Glass
By Offield, Towle & Linthicum
ATTORNEYS

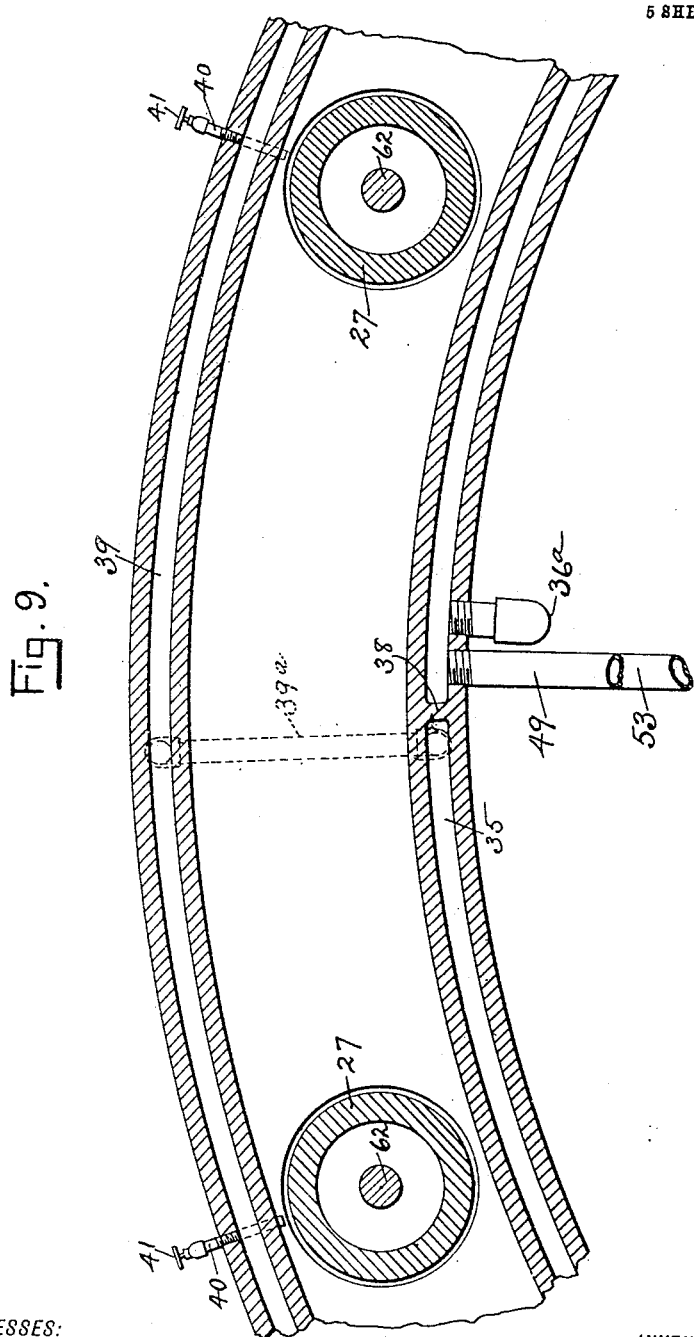

UNITED STATES PATENT OFFICE.

GEORGE G. GLASS, OF HOOPESTON, ILLINOIS.

CAN-CAPPING MACHINE.

No. 874,956.  Specification of Letters Patent.  Patented Dec. 31, 1907.

Application filed July 22, 1905. Serial No. 270,781.

*To all whom it may concern:*

Be it known that I, GEORGE G. GLASS, a citizen of the United States, residing at Hoopeston, in the county of Vermilion and State of Illinois, have invented certain new and useful Improvements in Can-Capping Machines, of which the following is a specification.

My invention relates to that class of machines employed in canning operations which effect the sealing of the filled cans by soldering to the latter the caps which cover the openings in the top through which the contents have been previously introduced.
In most machines of this character the sealing is effected by means of a rotary annular soldering iron that is maintained heated and brought into contact with the top of the can, means being employed for feeding a strip of solder thereto to effect the uniform distribution of solder to the joint between the cap and top wall of the can.

My present invention contemplates several improvements in a machine of this character, among which may be mentioned a novel means for centering the cans when raised into engagement with the soldering irons; a novel means for heating the soldering irons through which the heat radiated by the irons reacts, as it were, upon the heating agent (a mixture of gas or oil vapor and air), driving off moisture and placing said mixture in a more highly combustible and efficient condition; an automatically controlled solder feed, according to which, if no can is presented, or if the can presented lacks a cap, no solder is fed to the iron, thus preventing a waste of solder and fouling of the machine, a novel means for imparting rotation to the soldering irons; novel means for engaging and releasing the cans at the proper intervals in the operation of the machine; and other minor features which will be more particularly pointed out in the following description and claims.

Some of the features constituting my present improvements are, as will be evident from the following description, capable of use in connection with other than can capping machines, such as can filling machines, or machines that perform any operation upon cans in the canning process as at present carried out; but for the sake of convenience I have illustrated these various features in connection with a capping machine, reserving the right to their exclusive use upon any machine employed in canning operations to which they are applicable.

Figure 4:
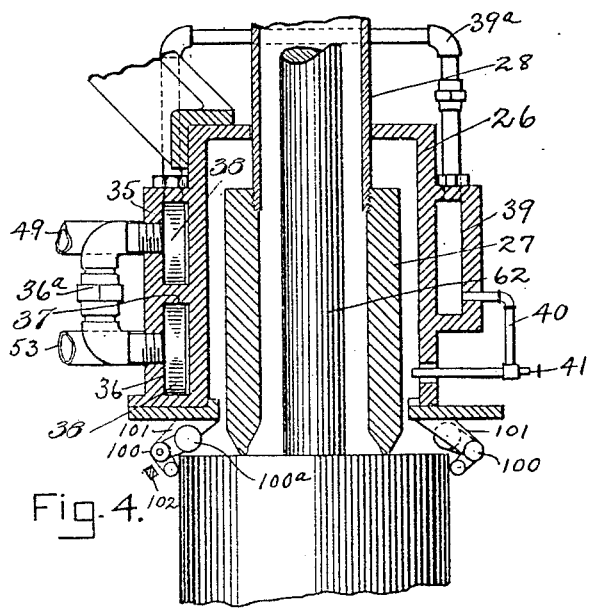
Figure 5:
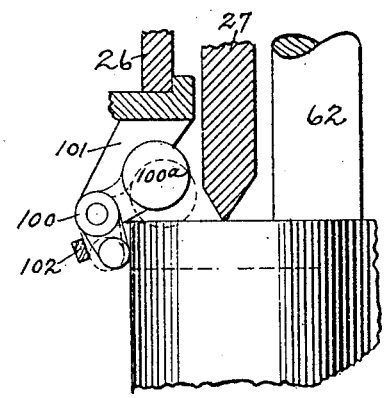
Figure 6:
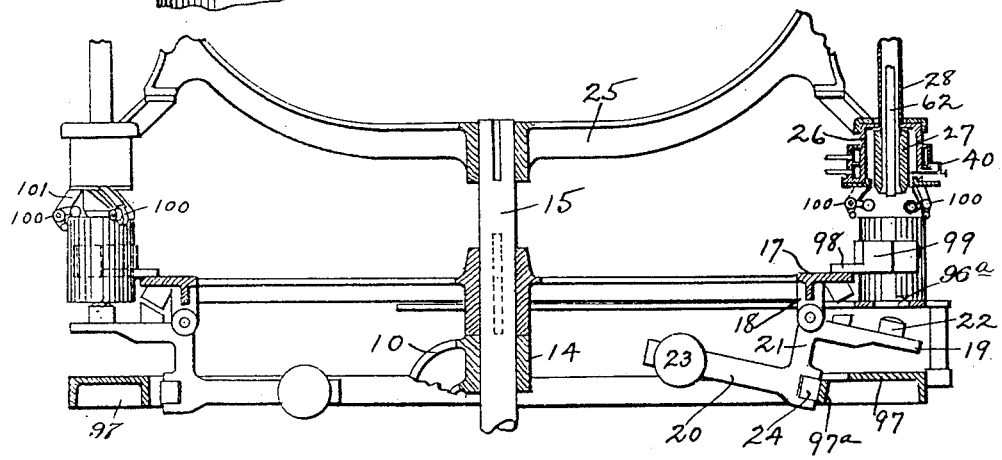
Figures 7, 8:
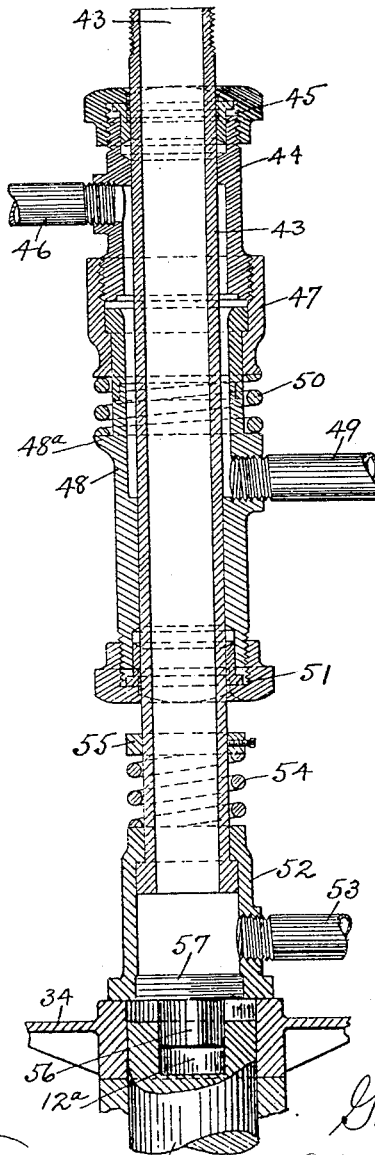

In the accompanying drawings I have illustrated preferred mechanical embodiments of my improvements and referring thereto Figure 1 is a top plan view of my improved capping machine, certain of the parts being broken away to better disclose the underlying mechanisms; Fig. 2 is a central vertical section through approximately one half of the machine; Fig. 3 is a detail elevational view of a part of the solder-feed controlling mechanism; Fig. 4 is an enlarged vertical sectional view through one of the soldering irons and its heating means; Fig. 5 is a still further enlarged detail fractional view of Fig. 4, more particularly illustrating the means for centering the cans; Fig. 6 is a central vertical sectional view through the can-carrying mechanism and the immediate superposed elements; Fig. 7 is an enlarged central vertical sectional view through the air and gas receiving and distributing element that supplies the heaters of the soldering irons; Fig. 8 is a top plan view of Fig. 7; Fig. 9 is an enlarged horizontal sectional view through the annular heating box or chamber, more particularly showing the means for mixing the air and fuel and directing the same against the soldering irons. Fig. 10 is a fragmentary detail bottom plan view of a portion of the pedal-operated mechanism for raising the central sleeve of the machine.

The machine herein illustrated is of the type employing a rotary can support or carrier operating in conjunction with an annular series of soldering irons disposed concentric with said carrier and themselves rotatable on their own longitudinal axes; the cans being fed in at one point on the periphery of the carrier, carried around by the latter, during which travel the soldering is effected and allowed to sufficiently cool and harden, and the cans being discharged at a point on the periphery of the carrier slightly in rear of the point of admission.

Referring to the drawings, 10 may designate a portion of the stationary frame of the machine provided with a central vertical support 11 for a central upright stationary shaft 12 secured therein as by a set-screw 13. Surrounding the shaft 12 and rotatably supported in a vertical bearing 14 of the frame 10 is a sleeve 15 on which is splined a spider 16 having an annular peripheral portion 17 provided at intervals with depending lugs 18.

Pivoted to said lugs is a series of can-supporting devices in the nature of counter-weighted levers; each of these devices comprising an outwardly extending can-supporting arm 19, an inwardly extending weight-supporting arm 20, and a vertical connecting member 21. The arm 19 has on its upper surface a lug 22 with a rounded or convexed upper surface designed to engage the base of the can at its central point, and the arm 20 has a counter-weight 23, and on its outer end carries a vertically journaled roller 24. These can-supporting devices are not claimed herein, but form in part the subject-matter of an application filed by me July 22, 1905 concurrently herewith, Serial No. 270,780.

Fast with the sleeve 15 above the spider 16 is another spider 25, the radial arms of which are herein shown with a series of branches $25^a$, $25^b$, $25^c$ and $25^d$ disposed beneath each other in the order named in substantially the common vertical plane of each arm. To the lower branch $25^a$ is secured an annular heating box, designated as an entirety by 26.
The lower and upper walls of this box are apertured at intervals to accommodate a series of annular soldering irons 27 and their hollow stems 28, which latter are journaled in bearings 29 and 30. To the upper end of each branch $25^d$ is pivoted at 31 a lever 32, the outer end of which is loosely connected to the stem of the soldering iron, while its inner end carries a roller 33 underlying an annular cam 34, the hub of which is fast on the upper end of the stationary shaft 12, resting on the upper end of the rotatable sleeve 15. The cam 34 has vertically offset semi-annular upper and lower portions $34^a$ and $34^b$, respectively, the roller 33 engaging the under surface of said cam.

Applied to the inner wall of the annular heating box 26 are a pair of upper and lower annular chambers 35 and 36, respectively, separated from each other by a horizontal partition 37 (Fig. 4). A vertical partition 38 (Fig. 9) interrupts the continuity of both of said chambers. Applied to the outer wall of the heating box 26 is an annular mixing chamber 39, from which latter a series of burner pipes 40 controlled by needle valves indicated at 41 pierce the lower portion of said outer wall of the heating box, directing the burning fuel against the walls of the soldering irons, as clearly shown in Fig. 4. Gas and air which are preferably under some pressure are supplied to the chambers 35 and 36 by the following means. Referring more particularly to Figs. 2, 7 and 8, 42 designates an air inlet pipe that leads into the upper end of a tube 43 disposed above and in axial alinement with the central fixed shaft 12. Surrounding this tube is a short sleeve 44 suitably packed at its upper end by a stuffing box 45, which sleeve is tapped laterally by a pipe 46 serving as an inlet for gas, oil, or oil vapor. Swiveled to the lower end of the sleeve 44 by a collar 47 is a rotatable sleeve 48 interiorly communicating with the sleeve 44, from which sleeve 48 extends a suitably bent pipe 49 serving to conduct the gas into the gas chamber 35 of the heating box, as shown in Fig. 2. To insure a gas-tight connection at the swiveled joint formed by the collar 47 a coil spring 50 is interposed between the lower end of said collar and an annular shoulder $48^a$ on the sleeve 48. The lower end of sleeve 48 is suitably packed by a stuffing box 51. On the lower end of the central tube 43 is swiveled a sleeve 52, from which a suitably bent pipe 53 conducts the air to the air chamber 36, of the heating box; a coil spring 54 interposed between the upper end of sleeve 52 and an adjustable collar 55 on tube 43 serving to maintain an airtight joint between the lower end of said tube and said sleeve 52. The sleeve 52 rests directly upon the hub of cam 34, and the upper end of the shaft 12 preferably has a central socket $12^a$ receiving a centering stud 56 on the lower end of a screw-threaded block 57 that closes the lower end of sleeve 52. The tubes 42 and 46 are constituted in part at least by flexible sections, such as hose, to accommodate the vertical adjustability of the above described coupling, as hereinafter described.

The chambers 35 and 36 are placed in communication closely adjacent to one side of the vertical partition 38 (Fig. 9) by a pipe $36^a$; while the upper chamber 35 is placed in communication with the mixing chamber 39 closely adjacent to the opposite side of the partition 38 by a pipe $39^a$.

For the purpose of imparting individual rotation on their own axes to the several soldering irons the stems of the latter are provided with small gears 58 which engage a stationary internally toothed gear ring 59 that is supported by bracket arms 60 from a series of frame uprights 61 disposed at intervals around the machine. The gear ring 59 is of greater width than the gears 58 in order to allow for a limited vertical play of the soldering irons and their driving gears while still maintaining the engagement of the latter with said gear ring.

Within the hollow stem 28 of each soldering iron is located a follower rod 62, the lower end of which is designed to rest centrally upon the cap of the can and maintain the latter in position during the soldering operation. In order that said follower rod may exert the desired degree of pressure upon the can the upper end thereof is pivotally connected at 63 to a lever 64, which latter is pivoted at its inner end at 65 to the upper end of the branch $25^d$ of the spider arm 25, while the other arm of the lever carries an adjustable weight 66. The outer end of lever 64 carries a vertically disposed bar 67 (Fig. 3), said bar having a short leg 67ª carrying a roller 68, and a longer leg 67ᵇ carrying a roller 69. Supported on the upper ends of the uprights 61 is a ring 70 constituting in part a track for the rollers 68 and 69, said ring, as best shown in Fig. 1, having an elevated portion 70ª extending through an arc of approximately 90 degrees and connected with the main portion of the ring by inclines 70ᵇ and 70ᶜ. The incline 70ᵇ extends upwardly relatively to the direction of travel of the bar 67 thereover, and the incline 70ᶜ extends downwardly relatively to such travel.

Describing next the solder-feeding mechanism, 71 designates a bracket secured to the inner side of one of the uprights 61, on which bracket is journaled a spool 72 carrying in coil form a strip of solder 73. 74 designates a lever pivoted at 75 to the lower side of the bracket 71; the inner end of said lever carrying a feed roller 76, and its outer arm carrying an adjustable weight 77. An upper roller 78 (interchangeable in various sizes to vary the extent of solder feed) is suitably journaled horizontally in the lower end of the bracket 71 at its inner end and is positively driven in a direction to feed the solder strip toward the soldering iron from a star wheel 79 contacted and partially rotated by the arms 19 of the can-supporting levers through a train of gears comprising a bevel pinion 80 on the roller shaft, said pinion being driven by a companion bevel pinion 81 on the lower end of a vertical shaft 82 journaled in the bracket 71; the upper end of said shaft having a small gear 83 engaged and driven by a similar gear 84 on the upper end of the shaft 85 of the star wheel, which latter shaft is rotatably supported in vertical bearings in the bracket 71 and also in an inwardly extending arm 86 carried by the upright 61. The bracket 71 is secured to the supporting upright 61 with capacity for a limited vertical adjustment thereon, which adjustment may be effected by raising the star wheel shaft by means of a hand lever 87 loosely connected to its lower end, or otherwise. The star wheel 79, not being intended to partake of such vertical adjustment, is splined on the shaft 85 with capacity for relative sliding movement thereon.

The solder feeding mechanism last described is automatically thrown out of action when the proper conditions attending the performance of its function are absent by the following mechanism. 88 is a vertical rod slidably mounted in the bracket 71 and in an arm 89 projecting inwardly from the upper end of the upright 61. The lower end of this rod is pivotally connected at 90 to the roller-carrying arm of lever 74, and at its upper end carries a head 91 (Fig. 3) having a cam surface 91ª that is upwardly inclined in the direction of travel of the lever 64. On the lever 64 and directly above the head of the rod 88 is a depending contact shoe 92 adapted, under some circumstances, to engage the cam surface 91ª and depress the rod 88, thus separating the feed rolls 76 and 78.

At 93 (Fig. 1) is indicated an adjustable feeding-in mechanism for the cans, which mechanism is not claimed herein, but constitutes the subject-matter of a companion application on can-feeding mechanism filed by me on the 22nd day of June, 1905, Serial No. 266,53. For the purposes of the present description it will suffice to state that said mechanism consists essentially of a guide chute having a pair of laterally adjustable side walls 94 capable of simultaneous movement toward or from each other by means of a hand lever 95 and eccentric link connections, said guide chute also having in its bottom wall a suitable conveyer serving to carry the cans in succession inwardly onto a stationary arc-shaped receiving plate 96 (Figs. 1 and 6) disposed opposite the receiving and discharging devices and just outside the periphery of the revolving ring 17, said plate having inwardly slotted ends 96ª and 96ᵇ. Below the revolving carrier ring 17 and the receiving and discharging plate 96 is a stationary ring 97, on the inner edge of which is formed or secured a curved cam track 97ª that is substantially co-extensive and conterminous with the receiving and discharging plate 96, as shown by dotted lines in Fig. 1, and is provided with inclined or sloping ends 97ᵇ and 97ᶜ, said track being adapted to be engaged by the rollers 24 as the can-supporting levers travel over that portion of their path lying opposite the receiving and discharging plate 96. Secured to and projecting radially from the upper face of the ring 17 (Figs. 1 and 6) are a series of short arms 98 carrying at their outer ends V-shaped members 99 which serve as pushers to move the can off the end of the plate 96 when first received thereon, and also serve in part to properly center and position the cans for engagement by the counter-weighted can-supporting levers.

A leading feature of my invention resides in automatically acting means for accurately centering the cans as the latter are raised into engagement with the soldering irons, and supporting them laterally in centered position. This means is best shown in Figs. 4, 5 and 6, and, in the form herein shown, comprises essentially a plurality of three or more free bell-crank levers 100 pivoted at their elbows to bracket arms 101 that depend from the heating box 26 around each opening therein. The upper arms of said bell-crank levers have weighted ends 100ª whereby the lower depending arms are caused to swing outwardly to an extent permitted by a stop 102 (Fig. 5), separating said arms sufficiently to receive between them the upper end of a can of the largest diameter intended to be served by the machine. From this it will be seen that as the can is raised into contact with the lower edge of the soldering iron, its upper end will strike the weighted ends $100^a$ of the levers, raising the latter and drawing inwardly against the sides of the can the lower arms, which will thereby tend to accurately position and laterally support the can preliminary to and during the soldering operation.

My present machine is designed to operate upon different sizes and capacities of cans, including cans varying both in diameter and in height; and to this end the solder-applying machine, including the soldering irons and their heating appliances and the solder-feeding mechanism are rendered vertically adjustable. The solder-feed mechanism is raised and lowered by the lever 87, as previously mentioned. For raising the central sleeve 15 a foot lever 103 pivoted on the frame at 104 may be employed, the inner end of said lever straddling the stationary shaft 12 and bearing against a vertically slidable bearing block 105 on which the lower end of sleeve 15 is stepped, as clearly shown in Fig. 10. Movement is imparted to said sleeve from a driving shaft 106 by means of bevel gears 107 and 108, shown in Fig. 2, the latter gear being splined on the sleeve so as to permit longitudinal movement of the latter without interrupting the rotary driving connection therebetween. The elevation of the sleeve 15 by depressing the foot lever 103 moves upwardly the spider 25, carrying the soldering irons and their driving and heating appliances; and also elevates the levers 32 and 64. The cam ring 34 and the superposed air and gas pipe coupling member also share in this adjustment, thus preserving the relation between said cam-ring and levers 32; but, of course, the cam-ring 70 remains stationary, and to preserve the proper relation between the latter and the lever 64, the bar 67 is reversed so as to bring its longer leg $67^b$ downwardly into operative engagement with the cam-ring.

In Fig. 1 is shown a simple form of can-discharging mechanism comprising a rotatable plate 109 that enters the receiving and discharging segment 96 in rear of the feeding-in mechanism, and an endless chain conveyer 110 carrying flights 111 that successively engage the cans and, in coöperation with a curved guide 112, deflect them out of the machine.

I have herein indicated, in Fig. 1, a pair of solder-feed devices operating upon two adjacent irons. It will be understood that in many cases a single solder-feed mechanism will suffice, but in some cases one or more auxiliary solder-feed mechanisms may be desirable to insure a more uniform and abundant supply of solder.

A more complete understanding of the machine may be had from a brief description of its connected operation. Preliminary to the feeding-in of the cans the soldering irons are heated by admitting gas or oil vapor and air through the pipes 49 and 53 to the chambers 35 and 36, respectively, such inflow of fuel being induced by a suitable pressure fan or other device. The air flowing through the connecting pipe $36^a$ mingles more or less with the gas or oil vapor, and the mixture, passing through the pipe $39^a$, enters the mixing chamber 39, whence it flows through the several burner pipes 40 and, being ignited at the tips of the latter, burns with intense heat against the walls of the soldering irons, rapidly heating the latter to a point at which the solder is readily fused upon contact therewith. The cans, having the caps placed thereon, are then fed in through the chute 93 into the receiving plate 96, where they are picked up by the pushers 99 and moved off the end of said plate. As each can travels over the slotted end $96^b$ of the plate, the roller 24 of its underlying pivoted carrier rides down the incline $97^c$ which causes the can-supporting lug 22 to rise, under the influence of the weight 23 through the slot $96^b$ into engagement with the bottom of the can, raising the same between the series of bell-crank levers 100 (by which the can is centered) into registration with the lower annular edge of the soldering iron, which latter is rapidly rotated, the cap being at the same time held firmly in place through engagement with the lower end of the pusher rod 62 which raises the head 67 of the lever 64 out of engagement with the track 70, thus making the weight 66 effective on the cap. At the same time the arm 19 of the carrier strikes one of the arms of the star wheel 79, turning the latter, and thereby advancing the soldering strip into contact with the lower end of the iron, by which the solder is melted, and, flowing down the iron, distributes itself over the joint between the cap and the top of the can, closing and sealing said joint. The can thus sealed is carried around through approximately one-half the path of rotation of the carrier, at which point the roller 33 of the iron-controlling lever 32 rides down the incline, connecting the high portion $34^a$ of the central cam with the low portion $34^b$, by which the iron is raised out of contact with the can, the follower rod 62 still bearing thereon. When the soldering iron reaches a point opposite the upward incline $70^b$ of the track 70, the roller on the end of lever 64 rides up said incline, thereby raising the follower rod and releasing the upper end of the can. At the same time that this occurs the roller 24 of the can-supporting lever rides up the incline $97^b$ of the inner cam ring 97, thereby lowering the lug 22 through the slot 96ª of the plate 96 at the same time that the can is deposited on said slotted end of said plate. The can, thus released, is pushed on into the field of action of the discharging device by which it is carried out of the machine.

In the event that a can fails to receive a cap, the follower rod is, of course, unsupported, and drops into the open end of the can, whereby the lever 64 remains in its lowermost position in which, as it sweeps around, the lug 92 strikes the inclined cap 91 of the rod 88, depressing the latter, and thus throwing the lower feed roller 76 out of engagement with the soldering strip, thus preventing the feeding of the latter and avoiding waste of solder. In the event that the cans are irregularly fed, and any one of the carriers fails to receive a can, the same interruption of the solder feed takes place, in which latter case also the arm 19 of the carrier swings upwardly to a position in which its outer end clears the arm of the star wheel, thus avoiding actuation of both rolls of the solder feed. In handling smaller sizes of cans the sleeve 15 and parts carried thereby, as well as the solder feed mechanism, are set in a low position, the cross-bar 67 on the end of lever 64, being set so that its shorter leg 67ª is lowermost. When a larger size of cans is to be handled, levers 87 and 103 are depressed, thereby elevating the parts of the soldering mechanism, and the cross-bar 67 is reversed to bring its longer leg 67ᵇ lowermost, as shown in the drawings.

With reference to the operating of the heating mechanism of the soldering irons, it will be observed that the constituents of the fuel are primarily heated up and brought to the highest stage of efficiency by thorough drying and dispelling of moisture by means of the heat radiated from the soldering irons as soon as the latter have been brought to operative condition. This increase in efficiency of the fuel is thus secured wholly at the expense of heat that would otherwise be idly and wastefully radiated. In this connection it should be explained that, the jets being deflected against the lower portions of the soldering irons, the latter become more highly heated than their upper portions, and consequently heat the air in the chamber 36 to a somewhat higher temperature than the gas in the chamber 35. This results in greater expansion and pressure of the air than of the gas, thus causing the air to flow into the gas chamber and mix with the gas therein.

With reference to the operation of the can-centering devices that are grouped around the lower ends of the soldering irons, it will be observed that these devices are entirely automatic in their operation and, being set far enough apart to receive and center the largest sizes of cans, they will also operate upon smaller sizes in the same way, since the upper edge of the can may contact with the inwardly extending arms of the centering levers at any point on said arms. These devices not only center the cans accurately with reference to the soldering irons but, in coöperation with the upward pressure exerted on the cans by their supporting levers, they serve to hold the cans securely against both lateral displacement and a tendency to rotate through friction induced by the soldering irons. This automatic centering means constitutes an important feature of the invention.

It is obvious that numerous and various modifications in the details of construction of the machine hereinabove described may be made without affecting the substance of the invention or departing from the principle thereof; and it is also evident that some of the mechanisms hereinabove described, such, for instance, as the can-centering means, might be usefully employed in other machines performing other operations upon cans. Hence I do not wish to be understood as limiting the invention strictly to the particular construction herein described and shown, nor to its application solely to a can-soldering machine.

I claim:

1. In a machine for operating upon cans, the combination with means for lifting and supporting a can, of an automatically operating can-centering mechanism comprising a plurality of pivoted devices having parts adapted to be struck and raised by the upper end of the can, and other parts adapted to be moved inwardly thereby against the sides of the can, substantially as described.

2. In a machine for operating upon cans, the combination with a rotary can-carrier, of a rotary annular member mounted above said can-carrier, and a plurality of pivoted centering devices mounted on said rotary annular member automatically engaging and centering the upper ends of the cans, substantially as described.

3. In a can-soldering machine, the combination with a rotary can-carrier and a superposed annular soldering iron guide carrying the soldering irons, of a plurality of counterweighted bell-crank levers mounted on the under side of said guide around the lower end of each soldering-iron and serving to engage and automatically center the cans as the latter are raised into engagement with said soldering-irons, substantially as described.

4. In a can-soldering machine, the combination with a soldering-iron and means for presenting a can thereto, of communicating gas and air chambers adjacent to and heated by said soldering-iron, means for introducing gas and air to said chambers, and a burner communicating with said gas chamber and directed against the iron, substantially as described.

5. In a can-soldering machine, the combination with a soldering-iron and means for presenting a can thereto, of communicating gas, air and mixing chambers all located adjacent to and heated by said soldering-iron, means for introducing gas and air to said gas and air chambers, and a burner connected with said mixing chamber and directed against the iron, substantially as described.

6. In a can-soldering machine, the combination with a rotary can-carrier, of a rotary annular heating box, a series of soldering irons disposed at intervals in said heating box, an annular fuel chamber formed on said heating box and heated by said soldering irons, means for introducing fuel to said chamber, and burners connected with said chamber and directed against said irons, substantially as described.

7. In a can-soldering machine, the combination with a rotary can-carrier, of a rotary annular heating box, a series of soldering-irons disposed at intervals in said heating box, annular gas and air chambers formed on said heating box and heated by said soldering irons, a connection between said chambers, means for introducing gas and air to said chambers, and burners communicating with said gas chamber and directed against said irons, substantially as described.

8. In a can-soldering machine, the combination with a rotary can-carrier, of a rotary annular heating box, a series of soldering irons disposed at intervals in said heating box, annular gas, air and mixing chambers formed on said heating box and heated by said soldering-irons, a connection between said air and gas chambers, a connection between said gas and mixing chambers, means for introducing gas and air to said gas and air chambers, and burners connected to said mixing chamber and directed against said irons, substantially as described.

9. In a can-soldering machine, the combination with a rotary can-carrier, of a rotary annular heating box, a series of soldering irons disposed at intervals in said heating box, annular gas and air chambers formed on one wall of said heating box, a mixing chamber formed on another wall of said heating box, a connection between said air and gas chambers, a connection between said gas and mixing chambers, means for introducing gas and air to said gas and air chambers, and burners connected to said mixing chamber and directed against said irons, substantially as described.

10. In a can-soldering machine, the combination with a rotary can-carrier, of a rotary annular heating box, a series of soldering-irons disposed at intervals in said heating box, annular gas and air chambers formed on the inner wall of said heating box, a mixing chamber formed on the outer wall of said heating-box, a connection between said air and gas chambers, a connection between said gas and mixing chambers, means for introducing gas and air to said gas and air chambers, and burners connected to said mixing chamber and directed against said irons, substantially as described.

11. In a can-soldering machine, the combination with a soldering-iron and means for presenting a can thereto, of a follower rod disposed axially of said soldering-iron and normally resting upon the cap of the can, a solder-feed mechanism, and connections between said follower rod and said solder-feed mechanism whereby the latter is rendered inoperative through the descent of the lower end of the follower rod below the plane of the top of the can, substantially as described.

12. In a can-soldering machine, the combination with a soldering-iron and means for presenting a can thereto, of a follower rod disposed axially of said soldering-iron and normally resting upon the cap of the can, a pair of solder-feed rolls, and connections between said follower rod and one of said solder-feed rolls whereby said rolls are separated through the descent of the lower end of the follower rod below the plane of the top of the can, substantially as described.

13. In a can-soldering machine, the combination with a rotary can-carrier, of a rotary member carrying a series of soldering-irons, weighted follower rods disposed axially of said soldering-irons, respectively, and normally resting upon the caps of the cans, a solder-feed mechanism, and coöperating devices connected to the latter and to said follower rods whereby said solder-feed mechanism is rendered inoperative when any one of said follower rods is unsupported, substantially as described.

14. In a can-soldering machine, the combination with a rotary can-carrier, of a rotary member carrying a series of soldering-irons, follower rods disposed axially of said soldering irons, respectively, and normally resting upon the caps of the cans, weighted levers connected to said follower rods, a pair of solder-feed rolls, and a rod connected to one of said feed rolls and adapted to be depressed to carry said rolls out of operative position through contact with any of said weighted levers when its follower rod is unsupported, substantially as described.

15. In a can-soldering machine, the combination with a rotary can-carrier, of a rotary member carrying a series of soldering-irons, follower rods disposed axially of said soldering-irons, respectively, and normally resting upon the caps of the cans during the soldering operation, and means whereby said follower rods are automatically raised from the cans prior to the discharge of the latter from the machine, substantially as described.

16. In a can-soldering machine, the combination with a rotary can-carrier, of a rotary member carrying a series of soldering-irons, follower rods disposed axially of said soldering-irons, respectively, and normally resting upon the caps of the cans during the soldering operation, actuating levers for said follower rods, and a cam-track engaged by said actuating levers to raise said follower rods from the cans prior to the discharge of the latter from the machine, substantially as described.

17. In a can-soldering machine, the combination with a fixed vertical shaft and a can-carrier rotatably mounted thereon, of an annular heating box also rotatably mounted on said shaft, annular air, gas and mixing chambers formed on said heating box, a coupling member having suitably packed and communicating stationary and rotatable elements superposed on said central vertical shaft, air and gas supply pipes leading to the stationary elements of said coupling member, and air and gas distributing pipes leading from the rotary elements of said member to said air and gas chamber, respectively, substantially as described.

18. In a can-soldering machine, the combination with a rotary can-carrier, and a vertically adjustable rotary soldering-iron-carrier, of a series of soldering-irons carried by the latter, follower rods disposed axially of said soldering-irons, follower rod-actuating levers pivoted at their inner ends to said soldering-iron carrier, a stationary cam-track underlying the outer ends of said levers, and invertible cross-bars having supporting legs of different lengths mounted on the outer ends of said levers and adapted to engage said cam-track, substantially as described.

19. In a can-soldering machine, the combination with a rotary can-carrier, of a vertically adjustable rotary soldering-iron-carrier, a series of soldering-irons carried by the latter, and a vertically adjustable solder-feed mechanism located opposite the circular path of travel of said soldering-iron, substantially as described.

GEORGE G. GLASS.

Witnesses:
GEO. E. LOCKWOOD,
CHARLES W. SPARHAWK.